(No Model.) 5 Sheets—Sheet 1.
C. G. LUNDBORG.
SCREW PROPELLED VESSEL.
No. 452,108. Patented May 12, 1891.
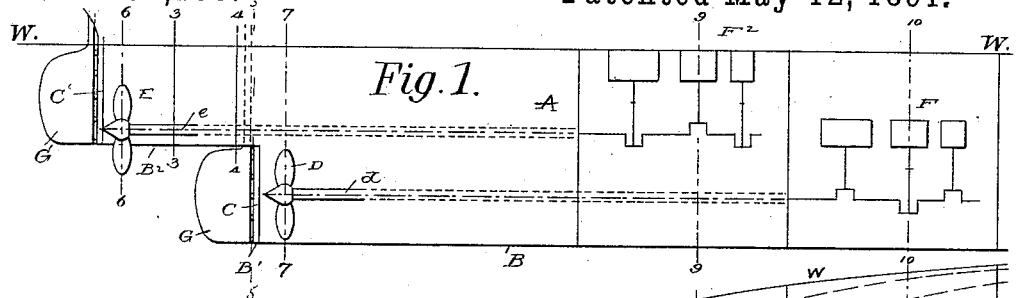
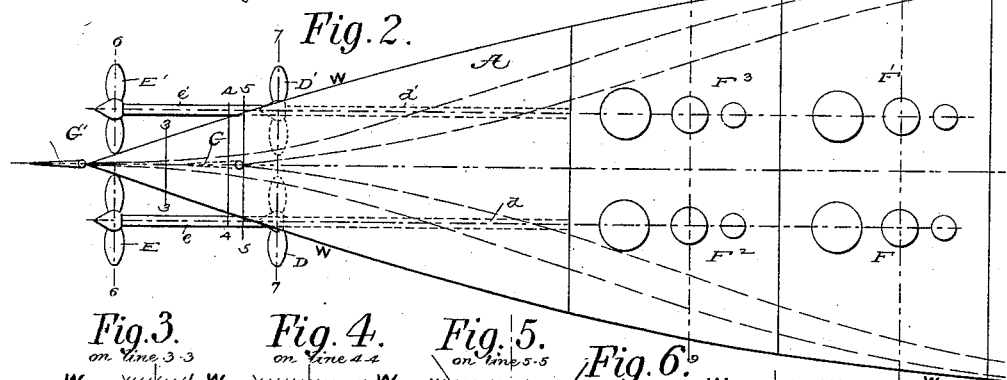
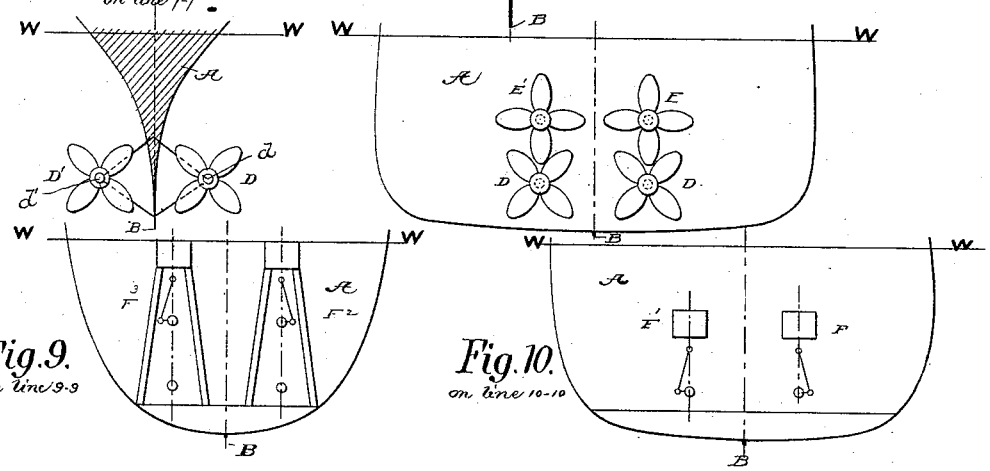
Witnesses
N. R. Kennedy
Fabius Stanly Elmore
Inventor
C. G. Lundborg
By his Attorney
Phil. T. Dodge (No Model.) 5 Sheets—Sheet 2.
C. G. LUNDBORG.
SCREW PROPELLED VESSEL.
No. 452,108. Patented May 12, 1891.
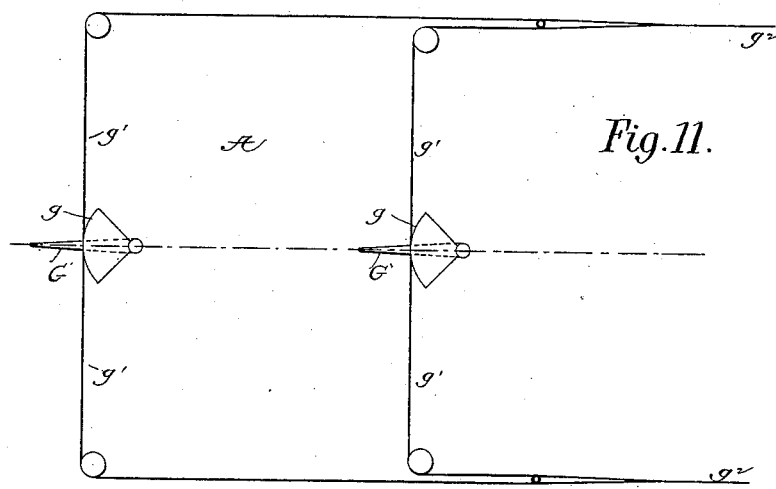
Fig. 11.
Fig. 12.
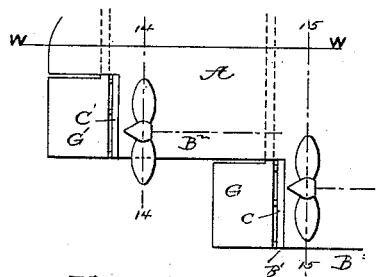
Fig. 13.
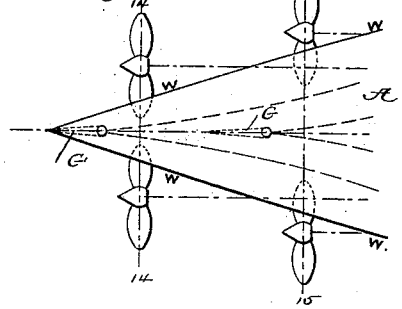
Fig. 16.
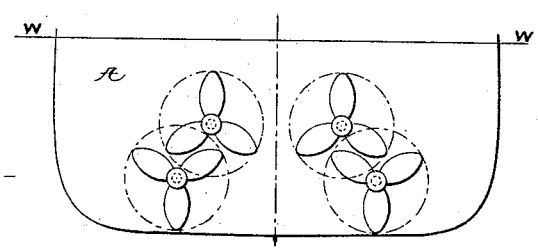
Fig. 15.
on line 15-15
Fig. 14.
on line 14-14
Witnesses
W. R. Kennedy
Fabius Stanly Elmore
Inventor
C. G. Lundborg
By his Attorney
Phil. T. Dodge
THE NORRIS PETERS CO., PHOTO-LITHO., WASHINGTON, D. C.

(No Model.) 5 Sheets—Sheet 3.
C. G. LUNDBORG.
SCREW PROPELLED VESSEL.
No. 452,108. Patented May 12, 1891.
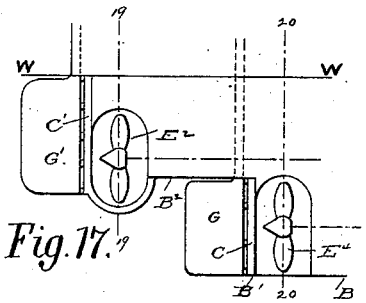
Fig. 17.
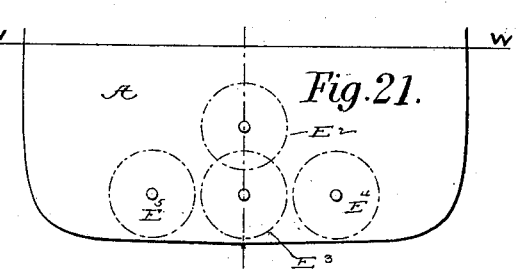
Fig. 21.
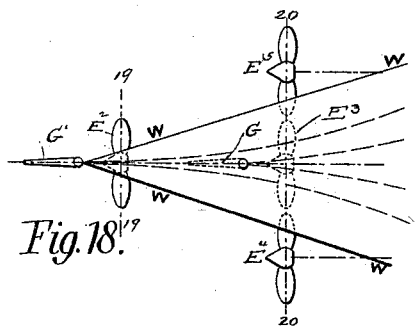
Fig. 18.
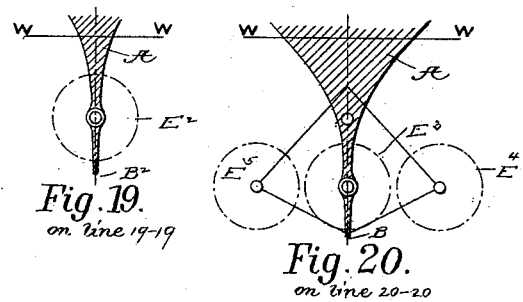
Fig. 19.
on line 19-19
Fig. 20.
on line 20-20
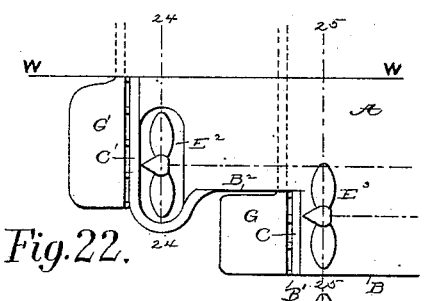
Fig. 22.
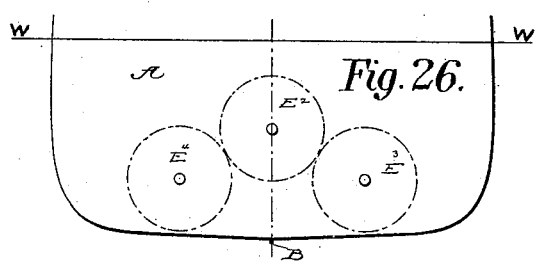
Fig. 26.
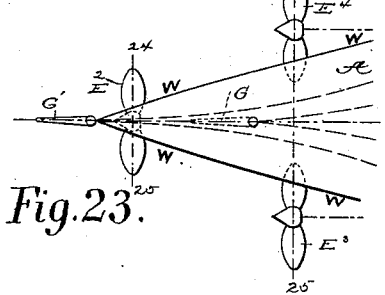
Fig. 23.
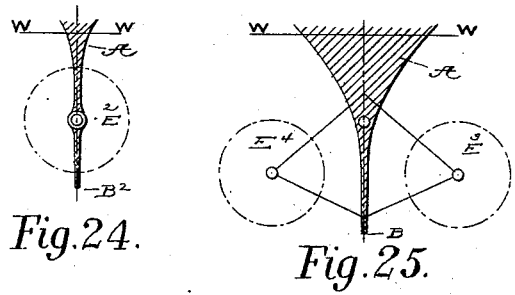
Fig. 24.
Fig. 25.
Witnesses
W. R. Kennedy
Fabius Stanly Elmore
Inventor
C G Lundborg
By his Attorney
Phil. T. Dodge (No Model.) 5 Sheets—Sheet 4.
C. G. LUNDBORG.
SCREW PROPELLED VESSEL.
No. 452,108. Patented May 12, 1891.
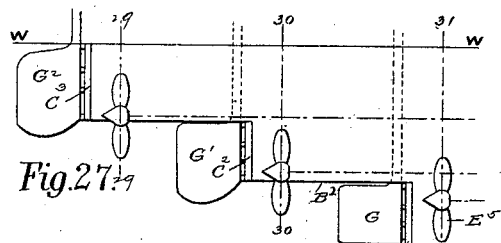
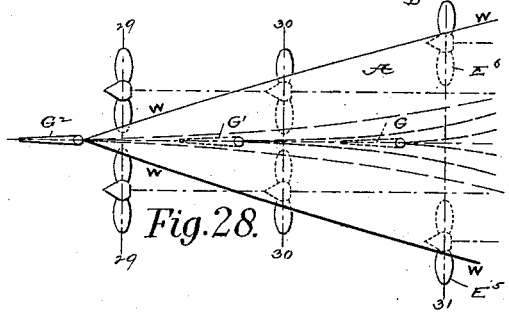
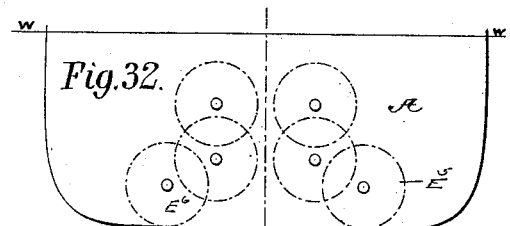
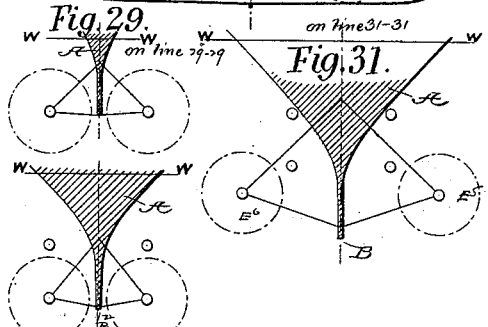
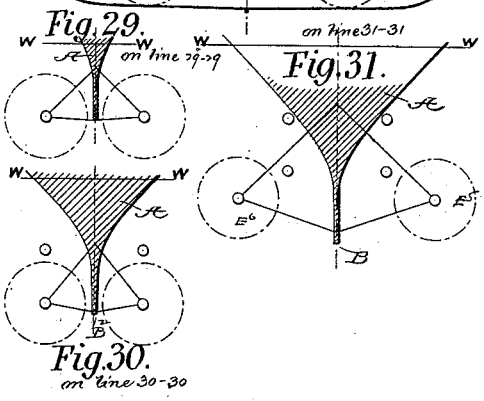
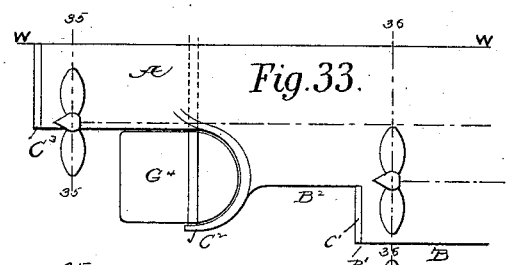
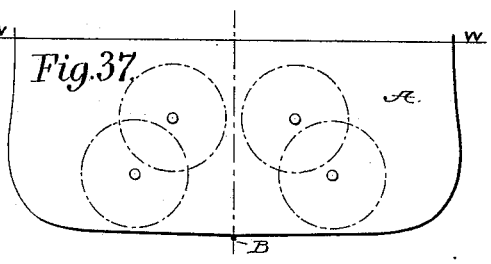
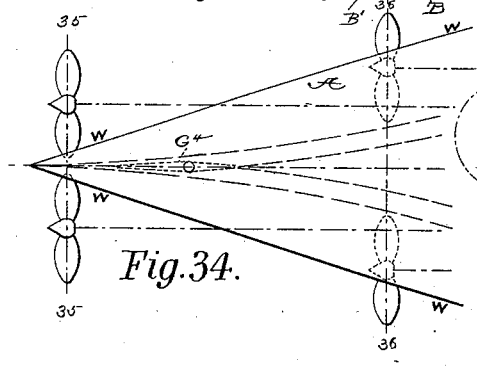
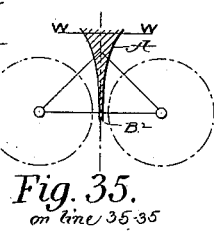
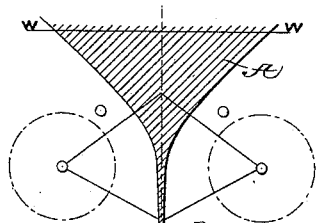
Witnesses
W. R. Kennedy
Fabius Stanly Elmore
Inventor
C. G. Lundborg
By his Attorney
Phil T. Dodge

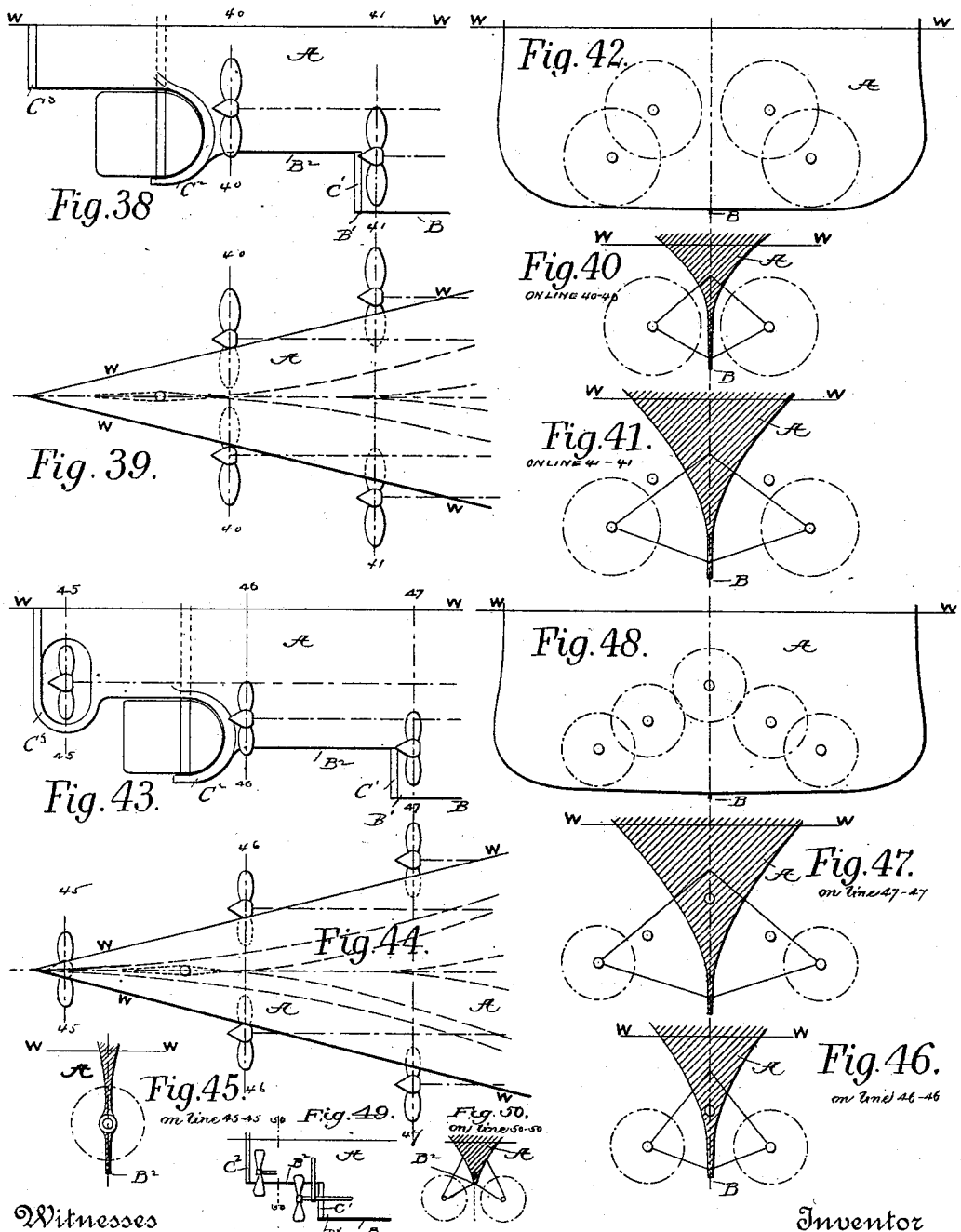

UNITED STATES PATENT OFFICE.

CHARLES GEORGE LUNDBORG, OF NEW YORK, N. Y.

SCREW-PROPELLED VESSEL.

SPECIFICATION forming part of Letters Patent No. 452,108, dated May 12, 1891.

Application filed November 6, 1890. Serial No. 370,506. (No model.)

*To all whom it may concern:*

Be it known that I, CHARLES GEORGE LUNDBORG, of New York, in the county of New York and State of New York, have invented certain Improvements in Screw-Propelled Vessels, of which the following is a specification.

The constantly-growing demand for steam-propelled vessels of increased speed requires a constant increase in the power and weight of the engines and their connections, and is attended with greatly-increased difficulties and risks in running such ponderous masses at the high speeds required. The adoption of twin propellers and the division of the propelling power between two engines made it possible to develop and apply a greater aggregate engine-power than was before possible with lighter engines, ships, and propellers. A point has, however, been reached beyond which it is hazardous to attempt to increase the power applied to two propellers. It has therefore been proposed to use, in connection with a hull of ordinary form, three independently-driven screw-propellers, one in the middle line at the stern, as usual, and the others one on each side, at a higher level, forward of the stern. This arrangement is open to the objection that the full and rapidly-converging lines of the hull prevent the water from reaching the forward propellers in an advantageous manner, and to the further objection that the rolling of the vessel is liable to uncover the forward propellers.

Now it is the aim of my invention, primarily, to produce a hull of such form or construction at the stern that any desired number of propellers may be used in connection therewith and that the water may be allowed a free, easy, and advantageous run to all of the propellers, to the end that they may act efficiently and economically in the propulsion of the vessel.

It is also an aim of my invention to arrange multiple propellers in advantageous relations to each other and to a hull constructed on my plan.

It is the further object of the invention to provide for the application of two or more rudders in such positions that they will act efficiently in directing the course of the vessel, and that in war-vessels they may be beyond the reach of the enemy's shot.

In order that the nature and scope of my invention may be the more fully and clearly understood, I have in the accompanying drawings, constituting a part of this specification, represented a number of hulls constructed in accordance with the invention, but modified according to the number and position of the propellers employed.

In the accompanying drawings, Figure 1 is a side elevation. Fig. 2 is a top plan view of a hull having two stern-posts and two rudders and two pairs of screw-propellers, each of the latter driven by independent engines. Figs. 3, 4, 5, 6, and 7 are cross-sections on the correspondingly-numbered lines of Figs. 1 and 2. Fig. 8 is a stern view showing the four propellers projected on a plane of the greatest transverse section of the immersed hull. Figs. 9 and 10 are cross-sections on the correspondingly-numbered lines of Figs. 1 and 2, showing the arrangement of the engines for driving the propellers. Fig. 11 is a top plan view showing on an enlarged scale the arrangement of the two rudders represented in Figs. 1 and 2. Figs. 12 and 13 are respectively a side view and a top plan view of a hull having two stern-posts and two pairs of propellers arranged in positions somewhat different from those of Figs. 1 and 2. Figs. 14 and 15 are cross-sections on the corresponding lines of Figs. 12 and 13. Fig. 16 is a stern view showing the propellers of Figs. 12 and 13 projected on a plane of the greatest transverse section of the immersed hull. Figs. 17 and 18 are respectively a side view and a top plan view of a hull provided with two rudders and four propellers. Figs. 19 and 20 are cross-sections on the correspondingly-numbered lines of Figs. 17 and 18. Fig. 21 is a stern view illustrating the position of the propellers in relation to the hull. Figs. 22 and 23 are respectively a side elevation and a top plan view of a vessel having two rudders and three propellers. Figs. 24 and 25 are cross-sections on the correspondingly-numbered lines of Figs. 22 and 23. Fig. 26 is a stern view showing the position and arrangement of the propellers represented in Figs. 22 and 23. Figs. 27 and 28 are respectively a side elevation and a top plan view of a hull having three rudders and six propellers arranged in pairs. Figs. 29, 30, and 31 are cross-sections on the correspondingly-numbered lines of Figs. 27 and 28. Fig. 32 is a stern view illustrating the relative position of the propellers shown in Figs. 27 to 31. Figs. 33 and 34 are respectively a side view and a plan view of a hull having two pairs of propellers and a single balanced rudder. Figs. 35 and 36 are cross-sections on the correspondingly-numbered lines of Figs. 33 and 34. Fig. 37 is a stern view illustrating the relative position of the propellers shown in the four preceding figures. Figs. 38 and 39 are respectively a side elevation and a plan view of a hull provided with two pairs of propellers and a single balanced rudder. Figs. 40 and 41 are cross-sections on the correspondingly-numbered lines of Figs. 38 and 39. Fig. 42 is a stern view showing the relative positions of the propellers. Figs. 43 and 44 are respectively a side elevation and a top plan view of a hull having a single rudder and five propellers. Figs. 45, 46, and 47 are cross-sections on the correspondingly-numbered lines of Figs. 43 and 44. Fig. 48 is a stern view showing the relative positions of the propellers shown in Figs. 43 to 47. Figs. 49 and 50 are a side elevation and a cross-section, respectively, showing a vessel with two stern-posts and two pairs of propeller-screws, the forward pair aft of the forward stern-post.

In each of the drawings, W represents the load water-line.

In constructing a hull in accordance with my invention its forward portion may be built of any ordinary or approved form; but the stern, instead of terminating in a single stern-post of great depth, as usual, is terminated below the water-line by two or more stern-posts located in the center line of the vessel, each at a considerable distance forward of the next and at a lower level, the horizontal water-lines of the hull being correspondingly modified at the different levels to give a long and easy run of the water inward past the respective posts. This construction of the hull with two or more stern-posts at different levels and at different points in its length with the lines drawn inward on the respective levels to meet the posts is the essence of my invention, and is to be found in slightly-modified forms in each of the constructions represented in the drawings.

Referring to Figs. 1 and 2, in which A represents the hull, it will be observed that I terminate the keel B, forming the deepest part of the hull, at a point B' some distance forward of the extreme after end of the vessel, at which point I erect a stern-post C, rising half-way to the load water-line, or thereabout. From the top of this post C the keel $B^2$, forming the deepest part of that portion of the hull, is extended rearward to a stern-post C', rising therefrom and forming the extreme after end of the hull, as usual. It will be observed that the portion of the hull between the two stern-posts has less depth or draft of water than that portion of the hull forward of the front stern-post B'. As shown in cross-section in Figs. 5, 6, and 7, the horizontal lines of the hull are given a long easy curvature, but drawn inward to the respective stern-posts, as shown by dotted lines, in such manner that the water is given a free and easy passage astern. In other words, the water is permitted to pass to each of the stern-posts in essentially the same manner—that is, in essentially the same direction as in passing the stern of an ordinary hull. To propel the hull thus formed I employ two pairs of propellers D D' and E E'. The shafts e e', carrying the rear propellers E E', are projected through the sides of the hull at the proper place and depth, supported in the ordinary manner, and provided with the propellers slightly forward of the rear stern-post C'. These propellers, it will be observed, are a considerable distance astern of the forward stern-post C. The forward propellers D D' are also carried by shafts d d', projected through the sides of the vessel and sustained in the ordinary manner, their propellers being located slightly forward of the front stern-post C and at a considerably lower level than the rear propellers, as plainly shown in Figs. 6, 7, and 8. It will be perceived that the water is allowed a long and easy run to each of the propellers, and that the latter are located in such relation to each other that they may all act efficiently and without interference. It will be observed on inspecting Fig. 1 that the draft of water of the after part of the hull abaft the stern-post C is about one-half of the draft forward of said post, and that on account of the shafts on the same side of the vessel being in the same longitudinal vertical plane the diameter of the forward propellers, in order that the blades may not project below the keel, is limited by the vertical distance between the two shafts. The part of the hull aft of the stern-post C may vary considerably in depth and draft of water.

With the hull constructed and the propellers arranged as above described the propeller-shafts may be independently driven by engines arranged in any suitable manner; but I recommend, as shown in Figs. 1, 2, 9, and 10, the employment of four independent engines F F' $F^2$ $F^3$, located in four distinct and independent compartments in the hull. The forward engines F F' are coupled directly to the forward ends of the lower shafts d d' for driving the lower and forward propellers. As the shafts of the rear propellers are at a higher level than the others, I drive them directly by overhead engines, and in order that these engines may be properly sustained without interference with the lower shafts I construct their frames, as shown in Fig. 9, to straddle both the upper and the lower shafts and rest in the bottom of the hull.

The steering of the hull constructed as above is effected by two rudders G and G', attached, respectively, to the stern-post C and C', one rudder G being forward of and at a lower level than the other. The rudders thus located may be operated by any suitable steering-gear; but I prefer to provide the rudder-posts at their upper ends, as shown in Fig. 11, with the ordinary sector-heads $g$, and to connect these heads through intermediate lines or chains $g'$, passing around suitable guides, to the single operating-lines $g^2$, whereby the two rudders are caused to move simultaneously and equally.

Passing now to the hull shown in Figs. 12 to 16, its construction will be found practically identical with that already described. It terminates like the first in two stern-posts C and C', the former located forward of and at a lower level than the latter. As in the first example, there are two rudders G and G', attached to the respective stern-posts. The rear rudder has its top located at some distance below the load water-line that it may be the better concealed and protected in the case of a war-vessel from the projectiles of the enemy. The stern-post is carried in suitable form rearward over the top of this rudder, so as to bring the rudder within the longitudinal limits of the hull. As in the first example, the vessel is propelled by two pairs of propellers on horizontal shafts projected outward through the quarters of the hull, two on each side of its central line. The forward and lower propellers are, however, arranged at a somewhat greater distance apart than the upper propellers, as plainly shown in Fig. 16. This arrangement gives an increased distance between the shafts on the same side of the vessel and permits the forward propellers to be made of greater diameter than under the arrangement shown in Figs. 1 to 8.

Figs. 17 to 21 illustrate still another arrangement of four propellers. The hull is formed with the forward and lower stern-post C, as in the preceding examples, but the rear post C' is extended somewhat below the level of the top of the forward post and given a curved form at its lower end to admit of the propeller $E^2$ being located immediately in front thereof, on the rear end of a shaft located in the middle line of the hull, as in single-propeller ships. A second propeller $E^3$ is located in the center line of the vessel forward of the front stern-post C and below the level of the rear propeller. Two additional propellers $E^4$ and $E^5$ are also located one on each side of the vessel in the same or substantially the same transverse plane as the propeller $E^3$. The shafts of these three forward propellers are preferably in the same horizontal plane, as shown, but the height of the side propellers $E^4$ and $E^5$ may be varied at will. Two rudders are hung upon the respective stern-posts, as in the preceding examples.

Referring to Figs. 22 to 26, the stern of the vessel is formed with two posts in essentially the same manner as in Fig. 17, and provided with two rudders hung upon said post. It is propelled, however, by three propeller-screws, one located in the center line of the vessel immediately in front of the rearmost stern-post C', as in Fig. 17. The remaining propellers $E^3$ and $E^4$ are located in essentially the same manner as that shown in Figs. 18 and 21, in a plane slightly forward of the front stern-post and on opposite sides of the center line of the vessel.

Figs. 27 to 32 represent a hull in which the stern is constructed with three stern-posts at different longitudinal points and in the center line of the vessel, but at different depths below the load water-line. The foremost post C' rises from the keel or lowermost portion of the hull. The second post $C^2$, located some distance aft of the post C', rises about half the distance to the load water-line, while the third post $C^3$ at the extreme stern of the vessel rises from the level of the top of the intermediate post $C^2$ to the top of the hull. The lines of the vessel converge to the respective stern-posts on their different levels, as shown in Figs. 29 to 31. It will be observed that this hull involves the same principles of construction as those previously described—that is to say, a plurality of stern-posts located at different depths and at different points in the length of the vessel, with the hull shaped to give a free run of the water past each of the posts. This hull, with its three posts, is propelled by three pairs of twin propellers located just forward of the respective stern-posts and at corresponding depths, the two propellers of each pair being located on opposite sides of the middle line of the vessel. I prefer to arrange the foremost propellers $E^5$ and $E^6$ at a greater distance from the middle line of the vessel than the others, and to place the two upper shafts on each side of the vessel in the same longitudinal vertical plane, as represented in Fig. 32; but their relative positions may be modified as the size of the propellers to be employed may demand. Each of the three stern-posts has a rudder hung upon it, as shown at G, G', and $G^2$.

In Figs. 33 to 37 I have represented a hull having three stern-posts, as in the preceding example; but the middle post, instead of being straight, is curved forward, as shown, in order to permit the use of a balanced rudder $G^4$, which is thus hung at a considerable depth below the surface and in a position of safety. This hull is provided with four propelling-screws arranged in pairs, the after propellers being hung at a higher level and forward of the rearmost stern-post, while the forward propellers, which are more widely separated, are located forward of the foremost post.

In Figs. 38 to 42 I have represented the hull having three stern-posts of essentially the same form and arrangement as those in Fig. 33, and with a balanced rudder hung upon the middle post. In connection with this hull I have shown two pairs of propeller-screws, one pair forward of the middle stern-post, the other forward of the forward post. The two propellers of each pair are in opposite sides of the middle line of the vessel, and the lower propellers are more widely separated than the upper.

In Figs. 43 to 48 I have shown a hull with three stern-posts, differing from that in Figs. 33 and 38 only in having the aftermost post curved downward similar to that in Fig. 22, in order to permit the use of a large propeller at the extreme stern. As here shown, the vessel is provided with five propellers, a center propeller at the middle line at the extreme stern, a pair of propellers forward of the middle post and below the level of the rear propeller, and a second pair of propellers forward of the front post at a lower level than the first pair and more widely separated.

It is to be noted that in each example of my vessel, as here illustrated, the lines are adapted to permit the free run of the water to and past each of the stern-posts, and that the propeller-shafts are in each case projected through and sustained outside of the vessel, either in the ordinary manner or by supports of any other construction adapted to maintain them in position.

From the foregoing description and explanation of the drawings it will be seen that my invention embraces and admits of a great variety of combinations and varied positions of any desirable number of propellers, either in the middle line or in the sides of the vessel, or in one or more of the stern-posts, the number of which may also vary, as desired, as well as the number and positions of the rudders. An immense aggregate engine-power and weight may be consequently divided between several comparatively light engines, propellers, and shafts, which may be easily and adequately supported and safely operated at high speed.

The invention as regards the shape of the hull also affords means of giving to each and all of the propellers such positions that the lines of the vessel will permit a free and direct run of the water to the disks of the propellers.

The invention also admits of the rudders and propellers being placed at such great depth below the surface of the water that in the case of war-vessels they are free from liability of injury by the enemy.

It will be observed that any one of the rudders represented may be made large enough to alone steer and maneuver the vessel. The upper propellers, owing to their position near the middle line of the vessel, are not exposed to the liability of raising when the ship rolls in a heavy sea. The lower propellers, owing to their depth, are never uncovered, and they must therefore act steadily in all weathers, while their greater distance from the vessel's middle line gives them a greatly-increased maneuvering power.

The propellers on each vessel may be made of the same or of different diameters, as preferred, and they may be placed either forward of the adjacent stern-post, which is preferred, or placed farther aft, or even astern of the stern-posts, if desired, as represented in Figs. 49 and 50.

The height or depth of the several stern-posts and their distance from each other may be modified at will within reasonable limits.

The form of the hull both in longitudinal and transverse section may be modified at will, provided only it is constructed with the series of stern-posts at different depths, or, in other words, reduced in draft step by step toward the stern, the lines in the different horizontal planes being modified accordingly.

The hull represented in Figs. 49 and 50 is identical with that shown in Figs. 1 and 2; but the forward propellers are arranged aft of the forward stern-post, instead of being forward of the post, as shown in Fig. 1.

In Figs. 17, 22, and 43 it will be observed that the shaft of the propeller in the middle line of the vessel lies directly over the forward rudder. Hence it will be necessary to construct the rudder-head in the form of a yoke, as is commonly practiced, in order that it may straddle the shaft.

In each of the plan views in the drawings the curved dotted lines represent the exterior lines or water-lines of the hull in the horizontal planes of the respective propeller-shafts. In other words, the dotted lines extending forward from each of the stern-posts represent the water-line of the vessel in horizontal section on a plane passing through said post between its upper and lower ends.

The expression "stern-post" is used herein in its ordinary sense as indicating that part or piece which forms at the point at which it is located the after end or termination of the hull proper.

Having thus described my invention, what I claim is—

1. A vessel having a plurality of stern-posts located in its middle line at different points in its length and extending to different depths, substantially as described and shown.

2. A vessel having its after end reduced in depth and draft step by step toward its stern, with its water-lines gradually converging in each horizontal plane to the terminal point.

3. A vessel having its after end reduced in depth and draft step by step toward the stern and terminating in a series of central stern-posts at different depths, substantially as described and shown.

4. A vessel having in its middle line two stern-posts, one forward of the other, the forward post extended to a greater depth than the after post, and the latter carried below the level of the top of the forward post, whereby the use of a large central propeller at the stern is permitted.

5. A vessel having a plurality of stern-posts located at different points in its length and extending to different depths, in combination with a plurality of rudders hung upon the respective posts.

6. A vessel provided with two or more rudders located in the center line at different depths and at different longitudinal points.

7. A vessel provided at the stern with two rudders, one in advance of and below the other, in combination with steering-gear common to the two rudders and acting to move them in unison.

8. A vessel having in the center line a plurality of stern-posts extending to different depths in the water, in combination with a series of screw-propellers located adjacent to the respective posts.

9. A vessel the after end of which converges to and terminates in two stern-posts, in combination with two pairs of propeller-screws, one pair in advance of and at a lower level than the other pair, the two propellers of each pair on opposite sides of the center line of the vessel.

10. A vessel terminating in three stern-posts extending each to a greater depth than the one forward thereof, in combination with two pairs of propellers located one pair in advance of and deeper than the other, the two propellers of each pair on opposite sides of the middle line, and a centrally-located and still higher propeller at the stern.

11. A vessel provided on each side with two propellers, one in advance of and at greater depth than the other, in combination with two rudders located one between the two of each pair.

12. A vessel having two pairs of propellers, one pair forward of the other, the two propellers of each pair on opposite sides of the keel and the forward pair at a greater depth than the other.

In testimony whereof I hereunto set my hand, this 13th day of October, 1890, in the presence of two attesting witnesses.

CHARLES GEORGE LUNDBORG.

Witnesses:
 FABIUS S. ELMORE,
 WILLIAM WRIGHT MORTIMER.